United States Patent Office 3,746,654
Patented July 17, 1973

3,746,654
PROCESS FOR IMPROVING THE COLOR CHARACTERISTICS OF ANTIOXIDANTS
Kirkwood S. Cottman, Akron, Ohio, assignor to The Goodyear Tire & Rubber Company, Akron, Ohio
Filed Feb. 2, 1971, Ser. No. 112,033
Int. Cl. C08f 45/58
U.S. Cl. 252—400 A    8 Claims

ABSTRACT OF THE DISCLOSURE

Reaction products of phenolic compounds and dicyclopentadiene are prepared with improved color propereties through the addition of phosphites, such as trimethyl phosphite, to the reaction product or to the reaction mixture during the preparation of said reaction product.

---

This invention relates to a process of improving the color of phenolic antioxidants. More particularly it relates to a process of improving the color of certain phenolic antioxidants through the use of a phosphite compound.

Various phenolic compounds are known in the art as antioxidants for oxidizable organic material such as diene polymers. Included among these phenolic antioxidants are those described in U.S. Pats. 3,036,138 and 3,305,522. The phenolic antioxidants described in these patents are prepared by reacting phenolic compounds with dicyclopentadiene. The emphasis in the former patent is on a one-step process wherein the latter patent discloses a two-step process involving an alkylation step subsequent to the phenolic/dicycolpentadiene reaction. When the reaction between the phenolic compounds and the dicyclopentadiene is carried out in the presence of a boron trifluoride catalyst or complexes thereof, a highly colored phenolic reaction product results. Although the discoloration does not necessarily carry over into the polymer to which the antioxidant is added, it can sometimes tint the polymer and discolor the polymer on aging, for example, at high temperatures or at room temperature for long periods of time. It is desirable that the color of these phenolic antioxidants be improved and that their tendency to tint and/or discolor be reduced.

It is an object of the present invention to provide a process for improving the color characteristics of certain phenolic antioxidants. It is also an object of this invention to provide phenolic antioxidants which have a reduced tendency to discolor polymer compositions to which they are added. Other objects will be apparent from the following description and claims.

The aforementioned objects are accomplished by treating the product of the phenolic/dicyclopentadiene reaction with a phosphite compound.

The phenolic reactant/dicyclopentadiene reaction is extensively described in both of the aforementioned U.S. patents. The most recently issued patent also extensively describes the alkylation of the product of such a reaction. The phenolic antioxidants which are aided by the practice of the present invention not only include compounds described in the aforementioned patents, but other related compounds as well which will be described subsequently herein and which are prepared according to the basic teachings of the aforementioned patents.

The phenolic reaction products are prepared by reacting one mol of dicyclopentadiene with at least one mol of a phenolic compound conforming to the following structural formula:

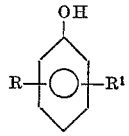

(I)

wherein R and $R^1$ are radicals selected from the group consisting of hydrogen and alkyl groups having from 1 to 16 carbon atoms. In the two-step reaction R is hydrogen and preferably $R^1$ is in a meta or para position. Preferred proportions of bound reactants in the resulting product are from 1.50 to 1.75 mols of phenolic compound per mol of the dicyclopentadiene. The reaction product of the dicyclopentadiene and phenolic compound can be subsequently alkylated with at least ½ mol of a tertiary olefinic material per mol of the dicyclopentadiene, said tertiary olefinic material having from 4 to 16 carbon atoms, preferably 4 to 12 carbon atoms. When the one-step process is used, preferably R is a tertiary alkyly radical and is in a position ortho to the hydroxyl group. In both the one-step, and two-step processess, $R^1$ is preferably hydrogen, methyl or ethyl.

Illustrative of phenolic compounds according to structural Formula I are as follows:

phenol
ortho-cresol
meta-cresol
para-cresol
para-ethylphenol
para-isopropylphenol
meta-n-butylphenol
para-tertiarybutylphenol
meta-tertiarybutylphenol
para-sec-butylphenol
para-isobutylphenol
para-n-hexylphenol
ortho-tertiaryhexylphenol
para-sec-heptylphenol
para-tertiaryheptylphenol
para(1,1,3,3-tetramethylbutyl)phenol
meta(1,1,3,3-tetramethylbutyl)phenol
para-n-octylphenol
para(2,2-di-methylbutyl)phenol
para-α-methylbenzylphenol
para-nonylphenol
ortho-dodecylphenol
ortho-octadecylphenol
ortho-octadedcylphenol
para-benzylphenol
ortho-benzylphenol
para(1,1,3,3,5,5-hexamethylhexyl)phenol
para(4-methylbenzyl)phenol
para(1,1,3-trimethylhexyl)phenol
para(ethylbenzyl)phenol
para(β-phenylethyl)phenol
2,4-dimethylphenol
2-tertiaryarybutyl-4-methylphenol
2-tertiarybutyl-4-methylphenol
2-tertiaryhexyl-4-methylphenol
2,6-ditertiarybutylphenol
2,6-dimethylphenol
3,5-dimethylphenol
2-(1,1-dimethylbutyl)-4-methylphenol
2,4-bis(1,1-dimethylbutyl)phenol
2,4-bis(1,3-dimethylheptyl)phenol
2-cyclohexyl-4-methylphenol
2-(α-methylbenzyl)-4-methylphenol
2-tertiarybutyl-5-methylphenol
2,4-bis(α-methylbenzyl)phenol
2,4-dibenzylphenol
2,4-dioctadecylphenol
2,3-diethylphenol
2,6-dimethylphenol
2,4-bis(β-phenylethyl)phenol The phenolic reactants of the present invention are synthesized by well known methods of alkylation of phenol and monosubstituted phenols consisting of o, m and p isomers. The preferred process is to treat the phenol or monosubstituted phenol with the appropriate olefins in the presence of a Friedel Craft type catalyst at a temperature of between 0° C. and 150° C. Preferred catalysts are H₂SO₄, the sulfonic acids and acid activated clays. Exact conditions such as catalyst quantity, temperature, molar ratios of olefin to phenol will depend upon the phenol and olefin being used, but are well known in the art. In case of dissimilar groups, such as tert.octyl and tert.butyl, mixtures of olefins may be used, but here it is preferred to react with the least active olefin first. Other alkylating agents such as alcohols and alkyl halides may be used; however, these agents are not preferred. Aluminum phenates may also be used as alkylation catalysts.

The reaction products of the one-step process contain compounds having the following structural formula

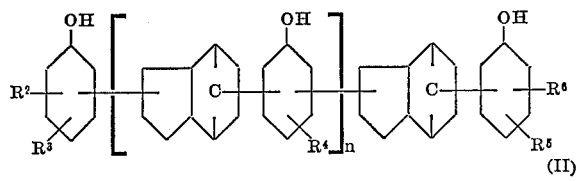

(II)

$R^2$, $R^3$, $R^4$, $R^5$ and $R^6$ are the counterparts of R and $R^1$ in structural Formula I. In the two-step reaction, R is hydrogen, $R^2$, $R^3$, $R^4$, $R^5$ and $R^6$ can therefore be tertiary alkyl groups resulting from the alkylation step. In the product of the first step in the two-step reaction, $R^2$ and $R^6$ will always be hydrogen.

Examples of compounds conforming to Structural Formula II are represented below by a listing of specific radicals and values of $n$, any combination of which in the structural Formula II above represents a specific compound within the scope of the present invention.

| $R^2$, $R^3$, $R^4$, $R^5$ and $R^6$: | $n$ |
|---|---|
| Hydrogen | 0 |
| Methyl | 1 |
| Ethyl | 2 |
| t-Butyl | 3 |
| t-Pentyl | |
| 1,1,2-trimethyl propyl | |
| 1,1-dimethyl butyl | |

The amount of olefinic material to be employed in the two-step reaction will depend upon the phenolic compound used and also upon the molar ratio of phenolic compound and the dicyclopentadiene in the reaction product. Thus the product prepared from phenol and dicyclopentadiene will react with more of the olefinic compound than the product from paracresol. Also a reaction product of phenol containing a 2:1 molar ratio of phenol and dicyclopentadiene will react with more olefin than a 1:1 product. Preferred proportions of reactants in the final alkylation product are from 1.0 to 2.0 mols of tertiary olefinic material per mol of the dicyclopentadiene when $R^1$ is an alkyl group, e.g., when paracresol or paraethyl phenol are reacted with the dicyclopentadiene to produce the product of step one. The preferred proportions of reactants in the final alkylation product are from 2.0 to 4.0 mols of tertiary olefinic material per mol of the dicyclopentadiene when phenol is reacted with the dicyclopentadiene to produce the product of step one. A slight excess of the alkylating agent is generally employed to assure that the desired amount reacts with the product from stage one.

The reaction between the dicyclopentadiene and the phenolic compounds is effectively catalyzed by boron trifluoride, as well as complexes based on boron trifluoride such as (1) BF₃:para-cresol complex
(2) BF₃:phenol complex
(3) BF₃ etherate The second step of the two-step reaction is effectively catalyzed by employing one or more of the customary acidic alkylation catalysts such as sulfuric acid, benzene sulfonic acid, toluene sulfonic acid, acid activated clays, boron trifluoride, zinc chloride, resin catalysts, ferrous and ferric halides, aluminum halides and the stannous and stannic halides. If a boron trifluoride catalyst is used in the second step, a portion of the phosphite compound is added to the final product after the alkyllation step. Sulfuric acid, benzene sulfonic acid, toluene sulfonic acid and acid activated clay are preferred catalysts for the second step of the two-step reaction. The catalysts employed in the phenolic/dicyclopentadiene step and alkylation step, if used, are employed in the customary catalytic amounts, which will normally vary from 0.1 percent to 5.0 percent of catalyst based on the total weight of the reactants in the reaction which is to be catalyzed.

Since boron trifluoride and complexes thereof tend to promote undesirable side reactions, it is preferred to remove the boron trifluoride catalyst before proceeding with the alkylation step. The boron trifluoride catalyst may be effectively removed as described in U.S. Pat. 3,305,522. Suitable basic materials also include calcium hydroxide. The acidic alkylation catalyst employed to catalyze the second step of the two-step process is normally neutralized with a suitable basic material such as a sodium carbonate solution.

The reaction between the dicyclopentadiene and the phenolic compound is normally conducted at a temperature from 25° C. to 160° C. Preferred reaction temperatures are between 80° C. and 150° C.

The molar ratio of phenolic compound to the dicyclopentadiene employed in the reaction mixture can be varied from 1:1 to 5:1 or more. The proportions usually employed range from 2:1 to 4:1 mols of phenolic compounds per mol of the dicyclopentadiene, a preferred ratio being 3:1. The about preferred proportions of reactants provide for a substantial excess of the phenolic compounds beyond that which will actually react with the dicyclopentadiene. The molar proportions of phenolic compound which reacts with the dicyclopentadiene usually varies from 1:1 to 2:1 with the preferred molar ratio of reactants in the product obtained from step one of the disclosed process ranging from 1.50 to 1.75 mols of phenolic compound per mol of the dicyclopentadiene. In some instances it may be desirable to carry out the phenolic/dicyclopentadiene reaction in an inert organic solvent such as benzene or toluene. The use of a solvent is particularly desirable if a relatively low ratio of phenolic compound to the dicyclopentadiene is used. When the molar ratio of phenolic compound to the dicyclopentadiene is 3 or more :1 the excess phenolic compound acts as an effective solvent and no additional solvent need be employed. When the phenolic/dicyclopentadiene product is to be alkylated, the excess, i.e., unreacted phenolic compound, can be separated from the phenolic compound/dicyclopentadiene reaction product prior to the alkylation step, or it can remain with said product. In either case an alkylated composition results which can be used effectively as an antioxidant.

The phenolic/dicyclopentadiene reaction can be carried out by adding the dicyclopentadiene to the mixture of phenolic compound and catalyst or the catalyst may be added gradually to the mixture of phenolic compound and dicyclopentadiene, the first of these two procedures being preferred. The rate at which the reactants are combined can vary over a wide range as long as the temperature is kept below 160° C.

A solution of the reaction mass obtained from the first step in an equal quantity of an inet hydrocarbon solvent such as benzene or toluene is used in carrying out the second step of the process. Alkylation is normally conducted at a temperature between 20° C. and 100° C. A preferred temperature range is between 60° C. and 80° C. If the tertiary olefin which is employed as an alkylation agent is a gas, it may be added to the reaction under pressure but the pressures should not exceed 30 pounds per square inch if excessive polymerization is to be avoided. In the alkylation step, it is also preferable to carry out the alkylation as rapidly as possible. However, the time within which the reaction is completed is dependent upon the activity of the alkylating agent used.

The hexylenes used herein include 2-methyl-1-pentene and 2-methyl-2-pentene. The amylenes include 2-methyl-1-butene and 2-methyl-2-butene.

The antioxidants of the present process are used in the same manner as described in U.S. Pat. 3,305,522 in stabilizing polymers.

The treatment of the phenolic reactant/dicyclopentadiene reaction product normally comprises contacting the reaction product with the phosphite while the reaction product is in a solution. Increased agitation and/or higher temperatures reduce the time necessary to properly treat the reaction product.

The treatment generally is performed at a temperature of from about 20° C. to about 160° C. and preferably from about 60° C. to about 140° C., preferably under agitation. Preferably the phosphorus containing compounds and phosphites formed therefrom are added or formed under conditions conducive to their remaining in the reaction medium area for a period of time sufficient for them to improve color, e.g., at a temperature below their boiling point.

The treatment of the reaction product can be accomplished in a variety of ways. For example, the phosphite can be added to the phenolic reactant or dicyclopentadiene before the reactants are combined. If this technique is used, it is preferred that lower amounts of phosphite be used since the phosphite tends to interfere with the performance of the boron trifluoride type catalyst. The phosphite can also be added to the final product in either a one-step or two-step reaction. In either case the reaction product is treated prior to isolation of the final product from the reaction medium.

As stated previously, it is known that phenolic reactant/dicyclopentadiene reaction products containing unsubstituted sites on the phenolic moiety in positions ortho or para to the hydroxy group can be alkylated (U.S. Pat. 3,305,522). The addition of the phosphite compound to the phenolic reactant/dicyclopentadiene reaction product in such a two-step reaction can occur before the alkylation step, subsequent to the completion of the reaction between the phenolic reactant and the dicyclopentadiene or subsequent to the alkylation step, but prior to isolation of the final two-step product from the reaction medium. Where the excess phenolic reactant is removed, e.g., by stripping, prior to the alkylation step, thereby temporarily isolating the intermediate first stage reaction product, it is preferred that the phosphite be added prior to the removal of the excess phenolic reactant.

Although it has not been substantiated, it is theorized that possibly a complex of the phenolic reactant, dicyclopentadiene, and the boron trifluoride catalyst is formed which adversely affects color characteristics. Routine distillation of the phenolic reactant/dicyclopentadiene product, although it removes a substantial portion or possibly all of the boron trifluoride catalyst, does not solve the color problem.

Rather than adding the phosphites directly as described earlier herein, said phosphites can be prepared in situ by adding a phosphorus containing compound capable of reacting with a phenolic compound to form a trisubstituted phosphite. Phosphorous trichloride is such a compound. These compounds will react with unreacted phenolic reactant to form a phosphite. They will also react with the phenolic reactant/dicyclopentadiene reaction product to form a trisubstituted phosphite.

The following phosphorus containing compounds are used to treat the phenolic reaction products of the present invention. They consist of trisubstituted phosphites and compounds capable of reacting with a phenolic compound to form a trisubstituted phosphite. It is also possible that a phenolic compound will take part in a transesterification reaction with the phosphorus containing compound. Nonetheless the resulting product is adequate to treat the phenolic reaction product of the present invention.

The phosphorus containing compounds conform to the following structural formula

(III)

wherein $R^7$, $R^8$ and $R^9$ are selected from the group consisting of halogen radicals and radicals having the following structural formula, —OR, wherein R is selected from the group consisting of substituted and unsubstituted organic radicals. The substituents possessed by the organic radicals include nitro, hydroxy and halo, e.g., chloro radicals.

The substituted and unsubstituted organic radicals include radicals selected from the group consisting of alkyl radicals having 1 to 20 (preferably 1 to 6) carbon atoms, aryl radicals having 6 to 20 (preferably 6 to 12) carbon atoms, cycloalkyl radicals having 5 to 20 (preferably 5 to 12) carbon atoms, aralkyl radicals having from 7 to 20 (preferably 7 to 12) carbon atoms and alkaryl radicals having 7 to 20 (preferably 7 to 12) carbon atoms. Preferably $R^7$, $R^8$ and $R^9$ are selected from the group consisting of chloro, and —OR where R is selected from the group consisting of methyl, ethyl, 1-chloroethyl, 2-chloroethyl, isopropyl, tertiary butyl, phenyl and p-tolyl.

The phosphorus containing compounds and methods for their preparation are well known in the art. Basically the compounds are prepared by completely or partially reacting hydroxy containing compounds such as alcohols and phenols with phosphorous trichloride. The disclosure of U.S. Pat. 2,733,226 illustrates a general method which can be used in preparing said phosphorus containing compounds.

trimethyl phosphite
dimethyl chloro phosphite
dichloro methyl phosphite
triethyl phosphite
dichloro methyl phosphite
chloro dimethyl phosphite
phosphorous trichloride
dibutyl chloro phosphite
dichloro butyl phosphite
triamyl phosphite
diamyl chloro phosphite
dichloro amyl phosphite
tris (2-chloroethyl) phosphite
tris (1-chloroethyl) phosphite
triisopropyl phosphite
trihexyl phosphite
tris (2-bromoethyl) phosphite
triisooctyl phosphite
tris (2-ethylhexyl) phosphite
tris (1,1,3,3-tetramethylbutyl) phosphite
trinonyl phosphite
tris (2,4-dimethylamyl) phosphite
triphenyl phosphite
tricyclohexyl phosphite
tris (4-methylphenyl) phosphite
tris (2,4-dimethylphenyl) phosphite
tris (nonylphenyl) phosphite
tris (4-chlorophenyl) phosphite
tris (4-bromophenyl) phosphite
tris (2-fluoroethyl) phosphite
tris (2-chloro-3-bromobutyl) phosphite
tris (4-tert.butyl) phosphite
tris (2-vinylhexyl) phosphite
trieicosyl phosphite tridodecyl phosphite
methyl ethyl phenyl phosphite
methyl diphenyl phosphite
diethyl phenyl phosphite
tricyclopentyl phosphite
tris (2-chlorononadecyl) phosphite
tris (2,4,6-trichlorononyldecyl) phosphite
dichloro nonadecyl phosphite
triisoheptyl phosphite
tris (2-methylhexyl) phosphite
tris (2-chlorohexyl) phosphite
tris (4-phenylphenyl) phosphite
tris ($\alpha$-naphthyl) phosphite
phosphite of stripped reaction product of para-cresol and dicyclopentadiene resin
phosphite of reaction product of para-cresol and dicyclopentadiene
phosphite of alkylated reaction product of para-cresol and dicyclopentadiene The following examples include illustrations of the practice of the present invention, which are intended to exemplify but not limit the practice of the present invention.

EXAMPLE 1

648 grams of para-cresol and 18 grams of a 25 percent $BF_3$ para-cresol complex were heated to 90° C. in a flask equipped with a stirrer, water condenser and thermometer. 264 grams of dicyclopentadiene was then added at 88° C. to 99° C. over a 35 minute period. After stirring 15 minutes, 19 grams of triethyl phosphite (1½ mole equivalent per mole $BF_3$) and 10 grams of $Ca(OH)_2$ were added. The reaction product was stirred at 90° C. for 1¼ hours and then the excess para-cresol was removed by stripping the reaction product to a pot temperature of 195° C. at 8 mm. Hg. The resinous product was dissolved in 608 grams of toluene and filtered. The toluene was then removed from the filtrate by stripping to a pot temperature of 200° C. at 8 mm. Hg. The light amber resin weighed 608 grams.

EXAMPLE 2

Same as Example 1 with the exception that 10.6 grams of $BF_3$ etherate was used instead of the para-cresol:$BF_3$ catalyst. The weight of the product was 594 grams.

EXAMPLE 3

The product from Example 2 was dissolved in 600 ml. of toluene and then 30 grams of toluene-sulfonic acid was added. The mixture was heated to 60° C. and reacted with isobutylene until no more would react. The reaction product was neutralized with 30 grams of $Na_2CO_3$ in 150 ml. of water. After decanting, the product was stripped to a pot temperature of 180° C. at 10 mm. Hg. The weight of product was 686 grams.

EXAMPLE 4

In the same equipment as used in Example 1, 324 grams of para-cresol, 9 grams of a 25 percent $BF_3$:para-cresol complex and 5.7 grams of triphenyl phosphite (½ theoretical molar amount of $BF_3$) were used. The mixture was heated to 90° C. Then 132 grams of dicyclopentadiene was added over a one-half hour period at 90° C. The reaction was exothermic. The deep red color that usually occurs was not as intense with the phosphite present.

EXAMPLE 5

To 235 grams of Example 4 was added 8.7 grams additional triphenyl phosphite. The reaction mixture was stirred at 120° C. to 130° C. for 1½ hours and then stripped to a pot temperature of 205° C. at 9 mm. Hg. The residue weight was 155 grams.

EXAMPLE 6

To 235 grams of Example 4 was added 3 grams
$$Ca(OH)_2$$
1 ml. water and 50 ml. of toluene. The mixture was stirred at 100° C. to 110° C. for 20 minutes. The color changed from red to amber. The mixture was stripped to a pot temperature of 205° C. at 9 mm. Hg. The residue weight was 153 grams.

EXAMPLE 7

This product was prepared in the same manner as the product of Example 1 with the exception that the triethyl phosphite was not used.

EXAMPLE 8

This product was prepared in the same manner as the product of Example 3 with the exception that the resin from Example 7 was used.

EXAMPLE 9

To a flask was added 82 grams of phenol and 30 grams of toluene sulfonic acid. At 130° C., 100 grams of propylene dimer, predominately 2-methyl,1-pentene, was added over a one hour period. The mixture was cooled and 150 grams of a resin prepared in the same manner as described in Example 2 and 150 ml. of toluene was added. 164 grams of propylene dimer was then added at 70° C. over a one hour period. The mixture was cooled to 30° C. and then 100 grams of propylene dimer was added. The reaction product was stirred two hours after the addition and then neutralized with 30 grams of $$Na_2CO_3$$

in aqueous solution. The product was decanted and then stripped to a pot temperature of 140° C. at 20 mm. Hg. The reaction mixture was filtered and the weight of product was 522 grams.

EXAMPLE 10

This product was prepared in the same manner as described in Example 9 with the exception that the 150 grams of resin used was prepared as described in Example 7.

EXAMPLE 11

The 100 grams of resin prepared as described in Example 1 was dissolved in 100 ml. of toluene and 9 grams of toluene sulfonic acid. At 70° C., 49 grams of propylene dimer was added dropwise over a one-half hour period. The reaction product was stirred one-half hour longer and then neutralized with 10 grams of $Na_2CO_3$ in aqueous solution. The product was decanted and stripped to a pot temperature of 165° C. at 17 mm. Hg. The weight of product was 131 grams.

EXAMPLE 12

The product was prepared in the same manner as described in Example 11 with the exception that the 100 grams of resin identical to that prepared in Example 7 was used.

EXAMPLE 13

This product was prepared in the same manner as that of Example 1 with the exception that $Ca(OH)_2$ was not used and 30 grams of triethyl phosphite was used. The light amber product weighed 595 grams.

EXAMPLE 14

This product was prepared in the same manner as Example 1 except 24 grams of phosphorous trichloride was used instead of the triethyl phosphite. The reaction mixture was stirred at 110° C. to 120° C. for two hours before the $Ca(OH)_2$ was added. The product was light amber in color.

EXAMPLE 15

This product was prepared in the same manner as Example 1 except 73.2 grams of tris (2-chloroethyl) phosphite was used in place of triethyl phosphite. The reaction mixture was stirred at 90° C. to 100° C. for one hour and then the volatiles were stripped off to a pot temperature of 190° C. at 20 mm. Hg. The light amber product weighed 532 grams.

EXAMPLE 16

Using the same equipment as described in Example 1, 492 grams of 2-tert.butyl para-cresol and 5.4 grams of $BF_3$ etherate were charged. The flask contents were heated to 90° C. and then 132 grams of dicyclopentadiene was added over a 30 minute period. After stirring 25 minutes, 20 grams of triethyl phosphite was added. The mixture was stirred at 90° C. for one hour. Five grams of $Ca(OH)_2$ was then added and the volatiles stripped to a column temperature of 175° C. at 12 mm. Hg. The product was dissolved in 150 ml. of toluene and filtered. The toluene was then stripped off to a pot temperature of 170° C. under vacuum. The light amber resin weighed 302 grams.

EXAMPLE 17

Using the same equipment as described in Example 1, 246 grams of 2-tert.butyl para-cresol and 4.5 grams of $BF_3$ para-cresol complex (25% $BF_3$) were charged. Over a 25 minute period 62 grams of dicyclopentadiene was added at 90° C. Then 8.3 grams of phosphorous trichloride was added at 60° C. The reaction mixture was stirred at 100° C. for one hour and then 12 grams of $Ca(OH)_2$ was added. The reaction product was stripped to a pot temperature of 195° C. at 20 mm. Hg. The product was dissolved in 300 ml. of toluene and filtered. The toluene was stripped from the filtrate to a pot temperature of 150° C. at 30 mm. Hg. The light amber resin weighed 204 grams.

EXAMPLE 18

The product was prepared in the same manner as that of Example 4 except the triphenyl phosphite was not added to the reaction mixture. The product was divided in half (232 grams+232 grams) and used in Examples 19 and 20.

EXAMPLE 19

To 232 grams of the product prepared in Example 18 was added 14.4 grams of dibutyl phosphite and 3 grams of $Ca(OH)_2$. The flask contents were stirred at 90° C. to 100° C. for one hour. The color changed from deep red to brown. The flask contents were stripped to a pot temperature of 220° C. at 30 mm. Hg. The product was mixed with 400 ml. of toluene and filtered. The filtrate was stripped to a pot temperature of 180° C. at 35 mm. Hg. The color of the resulting resin showed little or no improvement.

EXAMPLE 20

The product was prepared in the same manner as Example 19 except 9 grams of diethyl phosphite was used in place of the dibutyl phosphite. The color of the resulting resin showed little or no color improvement. The brown resin weighed 152 grams.

EXAMPLE 21

The product was prepared in the same manner as Example 4 except 5.4 grams of $BF_3$ etherate was used in place of the paracresol $BF_3$ complex and the triphenyl phosphite was not used. The deep reddish brown product weighed 461 grams.

EXAMPLE 22

To 230½ grams of the product prepared in Example 21 was added 17.5 grams of triphenyl phosphine. The mixture was stirred at 100° C. to 120° C. for one hour. The volatiles were then s tripped off to a pot temperature of 230° C. at 15 mm Hg. The product has only a slight color improvement to medium amber red.

EXAMPLE 23

The product was prepared in the same manner as Example 12 except $Ca(OH)_2$ was not used when preparing the first stage resin. The hexyalted brown resin weighed 139 grams.

To 100 grams of the resin dissolvd in 100 ml. of toluene was added 6 grams of triethyl phosphite. The mixture was stirred at 85° C. to 95°C. for one hour and then the volatiles were stripped off in the presence of one gram of dry $Na_2CO_3$ to a pot temperature of 170° C. at 25 mm. Hg. The resin was amber in color.

EXAMPLE 24

The product was prepared in the same manner as Example 1 except triethyl phosphite and $Ca(OH)_2$ were not used. To 100 grams of this brown resin was added 100 ml. of toluene to dissolve it. Then 6 grams of triethyl phosphite was added. The mixture was stirred at 90° C. to 100° C. for 50 minutes and then the volatiles were stripped off to a pot temperature of 170° C. at 15 mm. Hg. The product was amber in color.

Examples 1 to 6, 9, 11 and 13 to 17 are processes within the practice of the present invention. As indicated in Examples 19, 20, 21 and 22, the processes resulted in a dark product. Examples 19, 20 and 22 illustrate the fact that not all phosphorus containing compounds are as effective as the compounds of the present invention. As indicated by the percent transmission data in Table I, the processes of Examples 7, 8, 10 and 12 resulted in a darker product than their phosphite treated counterparts.

Percent transmission data was gathered at 525 hillimicrons on 4 percent carbon tetrachloride solutions of the products of various examples using a Beckman B instrument and a one centimeter cell. The results are listed in Table I.

TABLE I

| Example | Percent transmission |
|---|---|
| 1 | * 87.0 |
| 7 | 70.0 |
| 5 | * 70.0 |
| 6 | * 95.0 |
| 9 | * 87.8 |
| 10 | 81.0 |
| 11 | * 93.2 |
| 12 | 66.5 |
| 3 | * 89.2 |
| 8 | 88.0 |

*Data obtained on products treated with phosphites.

Examples 5 and 6 were both treated by adding the phosphite to the phenolic reactant. In Example 5 additional phosphite was added after the reaction between the dicyclopentadiene and the phenolic reactant was complete. In Example 6, calcium hydroxide was added after completion of the reaction.

For some unexplainable reason the transmission value for Example 5 was low. It is believed that by repeating Example 5 a product possessing a higher transmission value would be produced.

Although the difference in percent transmission values of Examples 3 and 8 is small, it is believed that the product of Example 3 possesses a more superior color. The percent transmission values differences for the lighter compounds do not always reflect the magnitude of the color differences as they appear to the naked eye.

Four batches (A, B, C and D) of antixodiant were prepared by reacting p-cresol and dicyclopentadiene, stripping off the excess p-cresol and butylating and reaction product.

Triethyl phosphite was added to two of the batches (C and D) prior to the stripping step. Gardner color determinations were made on 10 percent toluene solutions of the products of all four batches. Color data was also gathered on vulcanized (0.5 part of dicumyl peroxide)

and unvulcanized portions of Plioflex 5000[1] (hot polymerized emulsion polybutadiene) containing two parts by weight per 100 parts by weight of polymer of the products of said batches. The results are listed in Table II.

TABLE II

| Percent transmission, (10% toluene solutions) | A, 90.0 | B, 92.2 | C, 99.0 | D, 100 |
|---|---|---|---|---|
| $R_d$ | 70.8 | 74.3 | 77.8 | 76.9 |
| a | −5.4 | −6.0 | −4.6 | −3.9 |
| b | 29.4 | 24.9 | 16.6 | 12.8 |
| ΔE | 39 | 32 | 22 | 19 |
| Visual | Amber | Amber | Straw | Straw |
| Polybutadiene: | | | | |
| Unvulcanized: | | | | |
| $R_d$ | 43.8 | 49.7 | 56.5 | 60.4 |
| a | 1.6 | 0.9 | −0.9 | −2.0 |
| b | 21.7 | 21.1 | 20.7 | 19 |
| ΔE | 44 | 40 | 36 | 33 |
| Visual | (¹) | (¹) | (¹) | (¹) |
| Vulcanized: | | | | |
| $R_d$ | 60.3 | 63.7 | 65.3 | 67.6 |
| a | −2.2 | −1.9 | −2.0 | −1.9 |
| b | 14.6 | 13.8 | 12.4 | 11.5 |

¹ Off-white.

The $D_d$ value is high for white materials and low for black materials. Positive values of a indicate redness while negative values of a indicate greenness. Positive values of b indicate yellowness and negative values of b indicate blueness. The absolute values of a and b increase as the degree of discoloration increases. ΔE is a measure of color deviation from a given standard, in this case, magnesium oxide. Lower values of ΔE are desirable.

As indicated by the above data, the phosphite treatment improved color characteristics. Staining and discoloring data was also gathered, but overall did not reveal significant differences.

Any of the phenolic reactants, olefins and phosphorus containing compounds recited herein could be substituted in the preceding working examples to illustrate the improvement obtained in color characteristics through the use of the phosphorus containing compounds of the present invention.

In addition to the tertiary olefins specifically recited earlier herein, the following olefins illustrate, but do not limit, the tertiary olefins which can be used in the practice of the present invention.

isobutylene
2-methyl,2-butene
2-methyl,1-butene
2-methyl,1-pentene
2-methyl,2-pentene
2-methyl,2-hexene
2-methyl,1-hexene
2,4-dimethyl,1-heptene
2,4,4-trimethyl,1-pentene
2-methyl,1-pentadecene
2-methyl,2-dodecene
2-methyl,1-decene In some instances it appears that the use of a base such as calcium hydroxide can accelerate the color improvement reaction.

When the phenolic reactant is a dialkylated phenol, it is desirable to use a base such as sodium carbonate or calcium hydroxide to prevent dealkylation.

Although levels of the phosphorus containing compound as low as 0.25 mole per mole of $BF_3$ charged will offer some improvement in color, it is preferred that the molar ratio of the phosphorus containing compound to $BF_3$ be at least 1:1. Although higher levels can be used, for example, 3:1 and even 5:1 and 10:1 and higher, it is normally sufficient to use about a 2:1 or 3:1 ratio.

[1] Trademark of The Goodyear Tire & Rubber Company.

Phosphorous trichloride, triethyl phosphite and tris(4-methylphenyl) phosphite are particularly preferred phosphorous containing compounds.

U.S. Pat. 3,535,277 includes combinations of phosphites and phenolic antioxidants of the type described herein. However, it concerns itself with synergistic combinations and not with the treatment of phenolic compounds with phosphites to improve color.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a phenolic reaction product comprising reacting, in the presence of a catalyst selected from the group consisting of boron trifluoride and boron trifluoride complexes, one mole of dicyclopentadiene with at least one mole of a phenolic compound and reacting the resultant reaction product with at least one-half mole of a tertiary olefin having from 4 to 16 carbon atoms wherein a phosphorus containing compound is added to the reaction system subsequent to the reaction between the phenolic compound and the dicyclopenadiene and prior to the alkylation with the tertiary olefin, wherein the phenolic compound conforms to the following structural formula

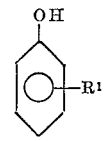

wherein $R^1$ is a radical selected from the group consisting of hydrogen and alkyl groups having from 1 to 16 carbon atoms and wherein the phosphorus containing compound conforms to the following structural formula

wherein $R^7$, $R^8$ and $R^9$ are selected from the group consisting of halogen radicals and radicals having the following structural formula, $—OR^{10}$, wherein $R^{10}$ is selected from the group consisting of alkyl radicals having 1 to 20 carbon atoms, aryl radicals having 6 to 20 carbon atoms, cycloalkyl radicals having 5 to 20 carbon atoms, aralkyl radicals having 7 to 20 carbon atoms and alkaryl radicals having 7 to 20 carbon atoms and wherein the level of the phosphorus containing compound is at least 0.25 mole of the phosphorus containing compound per mole of boron trifluoride.

2. The process according to claim 1 wherein $R^{10}$ is selected from the group consisting of alkyl radicals having 1 to 6 carbon atoms, aryl radicals having 6 to 12 carbon atoms, cycloalkyl radicals having 5 to 12 carbon atoms, aralkyl radicals having 7 to 12 carbon atoms and alkaryl radicals having 7 to 12 carbon atoms.

3. The process according to claim 2 wherein $R^7$, $R^8$ and $R^9$ are selected from the group consisting of chloro and $—OR^{10}$ wherein $R^{10}$ is selected from the group consisting of methyl, ethyl, 1-chloroethyl, 2-chloroethyl, isopropyl, tertiary butyl, phenyl and p-tolyl.

4. The process according to claim 1 wherein any phenolic compound which remains unreacted after the reaction between the phenolic compound and the dicyclopentadiene is removed by distillation prior to the alkylation step and wherein the phosphorus containing compound is added subsequent to the reaction between the phenolic compound and the dicyclopentadiene and prior to the distillation step.

5. The process according to claim 4 wherein the phosphorus containing compound is phosphorous trichloride.

6. The process according to claim 1 wherein the phosphorus containing compound is triethyl phosphite.

7. The process according to claim 1 wherein the molar ratio of the phenolic compound to the dicyclopentadiene is from 2:1 to 4:1, wherein the phenolic compound is selected from the group consisting of p-cresol, m-cresol, and p-ethyl phenol and wherein the tertiary olefin is selected from the group consisting of isobutylene; 2-methyl-1-butene; 2-methyl-2-butene; 2-methyl-1-pentene; 2-methyl-2-pentene; 2,4,4-trimethyl,1-pentene; and 2,4-dimethyl,1-heptene.

8. The process according to claim 7 wherein the phosphorus containing compound is selected from the group consisting of phosphorous trichloride and triethyl phosphite.

References Cited
UNITED STATES PATENTS

| | | | |
|---|---|---|---|
| 3,535,277 | 10/1970 | Miller et al. | 252—400 |
| 3,036,138 | 5/1962 | Mingasson et al. | 260—619 F |
| 3,305,522 | 2/1967 | Spacht | 260—619 F |

LEON D. ROSDOL, Primary Examiner

I. GLUCK, Assistant Examiner

U.S. Cl. X.R.

252—400 R, 404; 260—45.7 P, 45.95

PO-1050
(5/69)

UNITED STATES PATENT OFFICE
CERTIFICATE OF CORRECTION

Patent No. 3,746,654      Dated July 17, 1973

Inventor(s) Kirkwood S. Cottman

It is certified that error appears in the above-identified patent and that said Letters Patent are hereby corrected as shown below:

Column 2, line 53, "2-tertiarybutyl-4-methylphenol" should read
-- 2-tertiarybutyl-4-ethylphenol --.

Column 4, line 37, "about" should read -- above --.

Column 10, line 4, "hexyated" should read -- hexylated --;
lines 32 and 33, "hillimicrons" should read
-- millimicrons --;
line 67, "antixodiant" should read -- antioxidant --;
line 69, "and" second occurrence should read --the--.

Column 11, line 25, "$D_d$" should read -- $R_d$ --.

Column 12, line 24, "dicyclopenadiene" should read
-- dicyclopentadiene --.

Signed and sealed this 22nd day of January 1974.

(SEAL)
Attest:

EDWARD M. FLETCHER, JR.      RENE D. TEGTMEYER
Attesting Officer      Acting Commissioner of Patents